[11] 3,596,504

[72] Inventor Albert E. Frey
 Danbury, Conn.
[21] Appl. No. 790,309
[22] Filed Jan. 10, 1969
[45] Patented Aug. 3, 1971
[73] Assignee Automation Industries Inc.
 Century City, Calif.

[54] ULTRASONIC SEARCH UNIT
 13 Claims, 4 Drawing Figs.
[52] U.S. Cl. ........................................... 73/67.8,
 73/71.5
[51] Int. Cl. ........................................... G01n 29/04
[50] Field of Search ............................. 73/67.5,
 67.6, 67.7, 67.8, 67.9, 71.5; 310/8.1, 8.3, 8.7

[56] References Cited
 UNITED STATES PATENTS
 2,617,874 11/1952 Lewis ........................... 73/69 (X)
 3,451,260 6/1969 Thurstone .................... 73/67.9
 3,262,307 7/1966 Hart ............................ 73/71.5
 FOREIGN PATENTS
 148,573 1962 U.S.S.R. ....................... 73/67.9
 184,000 1966 U.S.S.R. ....................... 73/71.5

*Primary Examiner*—Charles A. Ruehl
*Attorney*—Dan R. Sadler

ABSTRACT: A nondestructive ultrasonic test system which includes a search unit with a crystal transducer which is cylindrical in shape end radiates beams of ultrasonic energy normal to the cylindrical axis of the crystal. A conically shaped reflector surrounds the cylindrical crystal transducer and reflects the beams therefrom into the workpiece. The reflector is deformable for change of the included angle of the conical shape to focus the beam.

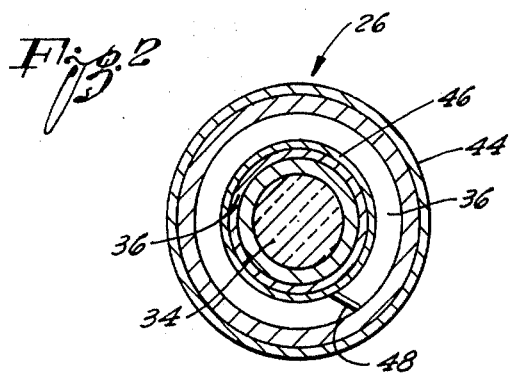
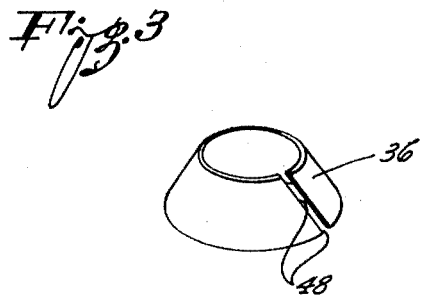
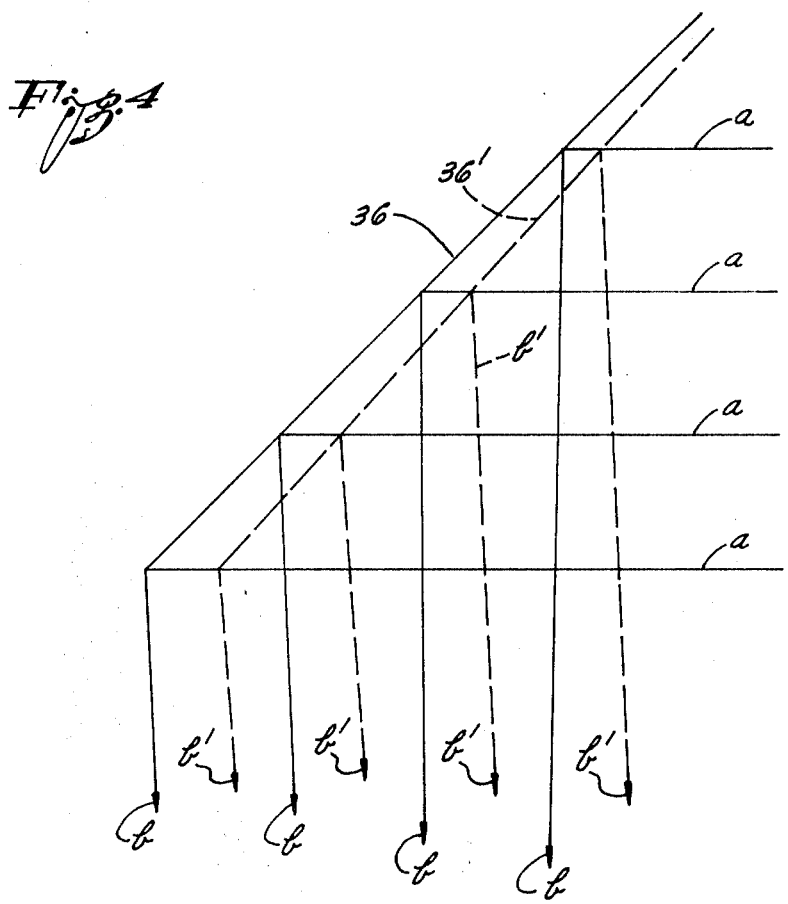
INVENTOR:
Albert E. Frey
ATTORNEY

3,596,504

ULTRASONIC SEARCH UNIT

BACKGROUND OF THE INVENTION

1. Field of the Invention

This invention relates to nondestructive search systems and more particularly to a novel and improved transducer search unit in the system.

2. Description of the Prior Art

In the prior art there is provided electrical nondestructive test equipment which generates ultrasonic vibrations by use of a crystal transducer. The vibrations from the transducer are then sent in the form of an acoustical pulsed beam into the workpiece being tested. The beam travels unimpeded through large metallic parts and reflects back from the end surfaces thereof. Any flaw, defect, or other discontinuity in the workpiece also causes reflections of the acoustical beams back to the instrument which indicates the location and size of the discontinuity on a display such as an oscilloscope. The search unit need only access to one side of the workpiece being tested. The pulse of high frequency vibration is projected from the search unit into the workpiece. A portion of the pulse is reflected back by the flaw or defect and the balance is reflected from the end surfaces. The return energy is amplified and displayed on the oscilloscope as vertical spikes. The screen on the oscilloscope shows spikes of the initial pulse, the defect and the back and front surface reflections. Spacing of the spikes on the scope is in proportion to distance the beam travelled in the material tested, thus locating the position of any flaw by irregularly spaced spikes.

Generally, the transducer in the present search units now in use have only a single focal point of the radiated ultrasonic beam. These single focus transducers provide a basic disadvantage in their use in test equipment. That disadvantage is that if the transducer radiates a broad beam, it is extremely difficult to detect small internal flaws or defects, especially those which are located within the near field region. On the other hand, if the transducer radiates a very narrow beam, it is extremely difficult to search large areas. Therefore, it has always been necessary to select a transducer that radiates a beam especially adapted to the particular operation being performed. Thus, an inventory of transducers was needed, one for each type of operation desired. Each time a different operation was to be performed, a different transducer was needed.

In some cases, ultrasonic transducers have been provided with variable focal lengths. For example, the prior art includes a search unit with a variable focal lens whereby the positioning of a focal lens changes the focus of the ultrasonic beam accordingly. Such prior art systems have proved unsatisfactory in some instances in that elaborate mechanisms are required, not only in the construction of these lenses, but also in providing for the apparatus which manipulates the focusing.

Thus, it can be seen that a need has arisen for an ultrasonic test system with a variable focusing search unit. A test system of this type would allow testing at different depths in a workpiece without changing search units or transducers.

SUMMARY OF THE INVENTION

Briefly described, the present invention in combination, for example, with a nondestructive test system, has a search unit including a cylindrical crystal transducer which radiates beams of ultrasonic energy on an axis normal to the cylindrical axis of the crystal. A conical reflector surrounds the cylindrical crystal and angularly reflects the beams of ultrasonic energy to a predetermined focal point. A conical reflector is deformable for changing the included angle of the conical reflector and thereby changing the focal points of the beams of ultrasonic energy by changing the reflective angle thereof. Means are included to deform the reflector, for example, by including a collar positioned into a cavity in the search unit housing and surrounding a portion of the conical reflector, and a threaded member which bears upon the conical reflector to cause the reflector to be compressed into the collar.

Such a system has the feature of being capable of adjusting the focal point of the ultrasonic energy of the transducer. Thus, a single search unit can be used to search at different depths. This type of search unit can also be used on a various thickness of workpieces.

BRIEF DESCRIPTION OF THE DRAWINGS

These and other features and advantages will become more apparent to those skilled in the art when taken into consideration with the following detailed description, wherein like reference numerals indicate like and corresponding parts throughout the several views, and wherein:

FIG. 2 is a section view of the ultrasonic search unit of the testing system shown in FIG. 1;

FIG. 3 is a perspective view of the reflector unit of the testing system shown in FIG. 1;

FIG. 4 shows energy lines of the reflected ultrasonic beams as they reflect from the reflector unit to different focal points.

DESCRIPTION OF A PREFERRED EMBODIMENT

Figure 1:
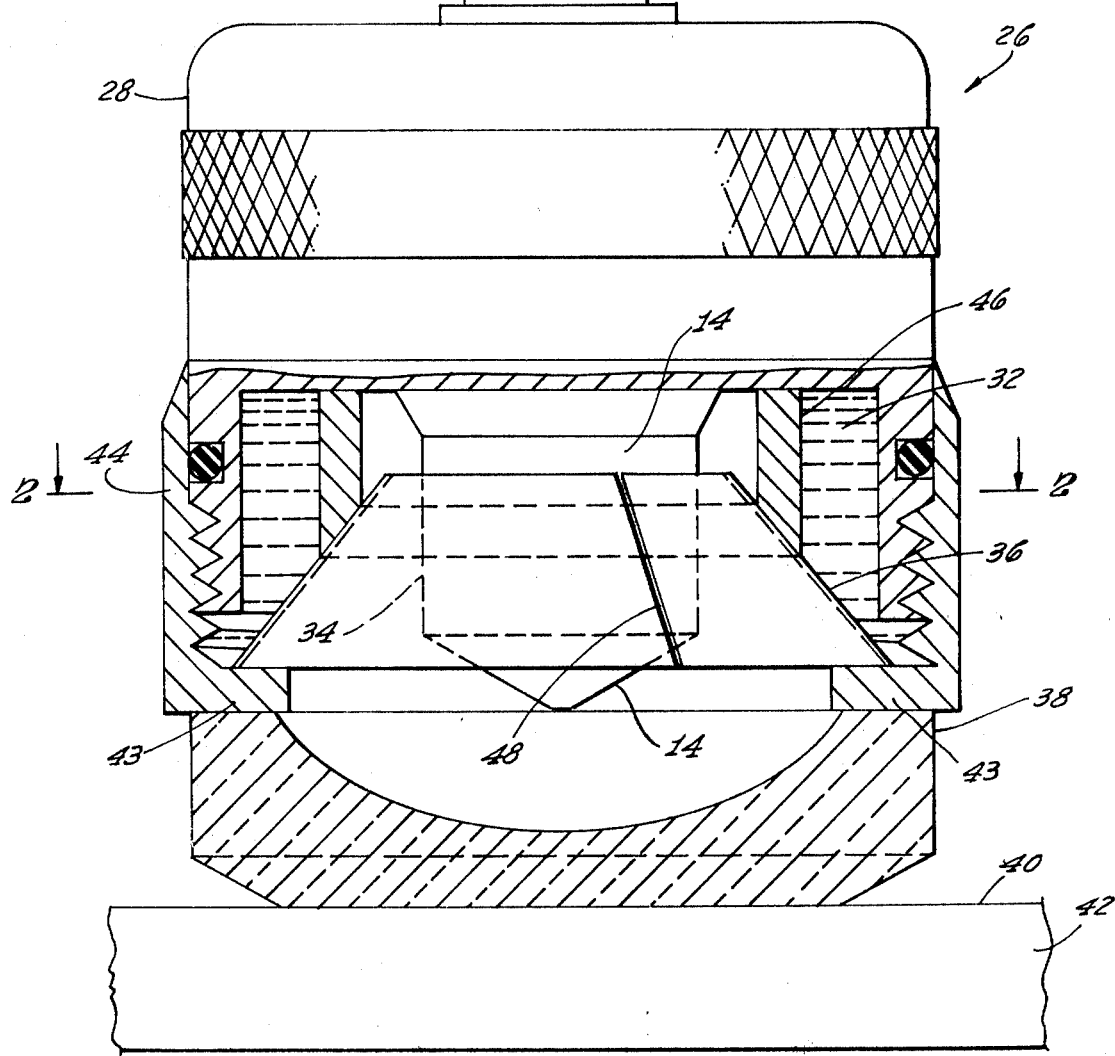
FIG. 1 is a block diagram of a nondestructive ultrasonic testing system embodying one form of the invention.

Turning now to FIG. 1, there is shown a nondestructive testing instrument 10 which includes a transmitter 12 which produces a series of intermittently occuring high voltage, high frequency pulses. The transmitter 12 is coupled to a transducer 14 by coaxial cable 16. The pulses emitted by the transmitter 12 excite the transducer 14 whereby a corresponding pulse of ultrasonic energy is transmitted therefrom.

Echoes from the pulses are received by the transducer 14 whereby a similar electrical signal is produced therefrom. This electrical signal is returned through the cable 16 to a receiver 18. The receiver 18 is coupled to an oscilloscope 20. The transmitter 12 is also coupled to a sweep generator 22 which, in turn, is also coupled to the oscilloscope 20.

The results of the output of the receiver 18 and the sweep generator 22 result in a display 24 on the face of the oscilloscope. The screen of the oscilloscope reflects the return energy in the form of spikes of the initial pulse. Also shown are spikes indicative of the defects and the back reflection from the material being tested. Spacing of the spikes is in proportion to the distance to the material tested. Any random spike which appears between the initial spacing is indicative of flaws, defects, or other discontinuity in the workpiece being tested. Thus, the location of these flaws is identifiable by the random spikes between the initial return spikes.

In accordance with the principle of this invention, the search unit 26 is provided to direct the beams of ultrasonic energy from the transducer 14 in a preferred direction. The search unit 26 comprises a housing 28 having a coaxial fitting protruding from one end thereof to which the coaxial cable 16 couples the search unit 26 into the test instrument 10.

The search unit 26 includes a housing 28 having a cavity 32 in the end opposite the coaxial fitting 30. Disposed within the cavity 32 is the transducer 4. The transducer in this particular embodiment comprises a cylindrical crystal 34 which emits radiations omnidirectionally in a plane normal to the cylindrical axis thereof. A conical reflector 36, which is comprised of a material which is suitable for reflecting ultrasonic vibrations, surrounds the transducer's crystal surface 34 and reflects the ultrasonic radiations from the inner surface thereof in a direction downwardly to a predetermined focal point depending upon the angular shape of the cone. Thus, the travelling radiant energy is directed into an axially directed beam. A lens 38 is disposed in the path of the beam. This lens is in the form of a contact shoe which is placed in acoustic communication with the surface 40 of the workpiece 42 which is under test. A threaded collar 44 threadably engages the housing 28 and has an inwardly protruding skirt 43 which bears against the reflector 36. The lens 38 is affixed to the skirt 43 of the threaded collar 44.

A cylindrical collar 46 is disposed within the cavity 32 of the housing 28. The reflector 36 protrudes into the collar 46 and is slidable therein. The reflector 36 has a slot cut therein along the entire longitudinal axis of the cone. In accordance with standard practice, the cavity 32 is filled with a liquid, such as water or glycerin, which acts as a couplant of the beams of ultrasonic vibrations to the workpiece 42.

To facilitate changing the angular reflective edge of the reflector 36, the collar 44 is threaded either inwardly or outwardly onto the housing 28 to deform the reflector 36 by compressing its diametrical distance when compressed within the collar 46. By the compressing of the entire diametrical distance of the conical reflector 36, the inside included angle thereof is changed, thus the angle of reflection is changed accordingly.

With reference now to FIG. 4, there is shown an angle which represents the reflector 36 and a straight line adjacent thereto which is indicative of the cylindrical surface 34 of the transducer 15. The solid lines "a" are indicative of the ultrasonic radiations from the crystal surface 34 and the lines "b" indicate the reflected ultrasonic radiation beams. Shown in dashed lines 36' is the angle of the conical radiation surface of the reflector 36 when it has been deformed in the manner previously described. The dashed lines "b" indicate the new incident of angle of reflection from the reflector 36' as deformed.

Thus, it can be seen that there has been provided by this invention a transducer search system which is capable of varying the angle of radiation of ultrasonic energy therefrom. The angle can be varied by manipulation of the knurled collar 44 within the search unit 26 to vary the length of the focal point emitted therefrom. When the collar 44 is screwed in, the angle of reflection decreases and the focal point of the beams of ultrasonic vibration energy is raised near the surface 40 of the workpiece 42. On the other hand, when the collar 44 is unscrewed, the angle of reflection is increased and the focal point of the beam of ultrasonic vibration energy is lowered into the workpiece. This facilitates the use of the search unit 26 to not only change the depth of search and scan, but also to pinpoint any flaw which appears therein and detect the exact distance of the flaw from the surface 40, for example.

Having thus described one preferred embodiment of this invention, what I claim is:

1. A search unit comprising:
a transducer for radiating ultrasonic energy, said transducer being a cylindrical crystal;
a reflector juxtaposed to said transducer for reflecting said energy into a beam, said reflector being conically shaped; and
focusing means for changing the focus of said beam, said focusing means including means for deforming said conical reflector.

2. An ultrasonic transducer comprising:
a cylindrical crystal means for emitting an omnidirectional beam of ultrasonic energy in a direction substantially normal to the cylindrical axis of said crystal;
conical reflecting means surrounding said cylindrical crystal means for angularly reflecting the ultrasonic energy in said beam toward a predetermined focal point; and
deforming means for changing the included reflective angle of said conical reflecting means for changing the focal point toward which said ultrasonic energy is reflected.

3. The ultrasonic transducer, as defined in claim 2, wherein:
said conical reflecting means includes a slot;
said deforming means includes a collar surrounding said conical reflecting means; and
means for compressing said conical reflecting means against said collar.

4. The transducer, as defined in claim 3, including:
a lens disposed on said transducer in the path of the ultrasonic energy reflected by said conical reflecting means toward said focal point.

5. A search unit for detecting defects in a workpiece, comprising:
a housing defining a cavity in one end thereof;
a transducer including a cylindrical crystal disposed in the cavity of said housing;
a conical reflector surrounding said crystal and having a slot defined therein;
a collar disposed within said cavity of said housing and surrounding a portion of said reflector and said crystal; and
focusing means for focusing said beam, including means for deforming said conical reflector by compressing said reflector into said collar.

6. The search unit, as defined in claim 5, wherein said focusing means includes a collar threadably mounted to said housing and having a skirt disposed about one end thereof which engages said conical reflector.

7. The search unit, as defined in claim 6, further comprising a contact shoe mounted to the skirt of said threadable collar.

8. A search unit comprising:
a transducer for radiating ultrasonic energy;
a conical reflector juxtaposed to said transducer for reflecting said energy into a beam; and
focusing means including means for deforming said conical reflector to change the focus of said beam.

9. The search unit as defined in claim 8 wherein:
said transducer has a substantially cylindrical shape and is adapted to radiate ultrasonic energy in directions substantially normal to the axis of said cylindrical shape.

10. A nondestructive test system for inspecting workpieces, said system including:
first means for providing pulses of electrical energy;
second means for receiving pulses of electrical energy;
display means responsive to said receiving means for displaying signals received thereby;
an ultrasonic search unit adapted to be coupled to the workpiece;
a substantially cylindrical crystal transducer positioned in said search unit and effective to radiate ultrasonic energy in directions substantially normal to the axis of said cylindrical crystal, said transducer being coupled to the first means and effective to radiate said ultrasonic energy in response to said pulses of electrical energy, said transducer being coupled to the second means and effective to provide electrical energy pulses in response to echoes of the ultrasonic energy;
a substantially conical reflector disposed in said search unit substantially concentrically about said transducer for reflecting said ultrasonic energy into the workpiece, said reflector being effective to reflect said ultrasonic energy on an angle determined by the included angle of said conical reflector; and
focusing means for changing the included angle of the reflector for moving the focal point of the ultrasonic energy within the workpiece.

11. The system as defined in claim 10 wherein:
said focusing means includes deforming means for changing the overall diameter of said conical reflector whereby the included angle of said conical reflector is changed.

12. The system as defined in claim 11 wherein:
said conical reflector includes a slot defined along the length thereof;
said deforming means includes a collar surrounding a portion of said conical reflector; and
means for yieldably compressing said conical reflector into said collar.

13. The test system as defined in claim 11 including:
a contact shoe lens disposed on said search unit and positioned in the path of the reflected ultrasonic energy and in acoustical communication with the workpiece.